(12) United States Patent
Joisten-Pieritz et al.

(10) Patent No.: US 10,619,558 B2
(45) Date of Patent: Apr. 14, 2020

(54) INTERNAL COMBUSTION ENGINE

(71) Applicant: DEUTZ Aktiengesellschaft, Cologne (DE)

(72) Inventors: Joachim Joisten-Pieritz, Kall (DE); Paul Schwabauer, Montabaur (DE)

(73) Assignee: DEUTZ AKTIENGESELLSCHAFT, Cologne (DE)

( * ) Notice: Subject to any disclaimer, the term of this patent is extended or adjusted under 35 U.S.C. 154(b) by 0 days.

(21) Appl. No.: 15/837,509

(22) Filed: Dec. 11, 2017

(65) Prior Publication Data
US 2018/0171863 A1 Jun. 21, 2018

(30) Foreign Application Priority Data
Dec. 15, 2016 (DE) .................. 10 2016 014 904

(51) Int. Cl.
*F01P 3/00* (2006.01)
*F02B 29/04* (2006.01)
*F02M 35/10* (2006.01)
*F02M 25/06* (2016.01)
*F01P 3/04* (2006.01)
*F01P 7/16* (2006.01)
*F02B 77/11* (2006.01)
(Continued)

(52) U.S. Cl.
CPC .......... *F02B 29/0443* (2013.01); *F01P 3/04* (2013.01); *F01P 7/162* (2013.01); *F01P 7/164* (2013.01); *F01P 7/165* (2013.01); *F02B 29/0406* (2013.01); *F02B 29/0412* (2013.01); *F02B 29/0437* (2013.01); *F02M 25/06* (2013.01); *F02M 35/10222* (2013.01); *F01P 2005/125* (2013.01); *F01P 2060/02* (2013.01); *F02B 77/11* (2013.01); *F02F 7/006* (2013.01); *Y02T 10/121* (2013.01); *Y02T 10/146* (2013.01)

(58) Field of Classification Search
CPC .. F02B 29/0443; F02B 29/04; F02B 29/0406; F02B 29/0412; F02B 29/0437; F02B 77/11; F01P 3/04; F01P 3/20; F01P 7/162; F01P 7/165; F01P 2005/125; F01P 2060/02; F02P 7/164; F02F 7/00; F02M 25/06; F02M 35/10; F02M 35/10222
USPC ...................................... 123/41.29
See application file for complete search history.

(56) References Cited

U.S. PATENT DOCUMENTS

| 787,154 A | 4/1905 | Delehant | |
| 4,342,290 A * | 8/1982 | Drakulic | F01P 5/10 123/198 C |

(Continued)

FOREIGN PATENT DOCUMENTS

| DE | 19813532 | 9/1999 |
| DE | 102005004778 | 8/2005 |

(Continued)

*Primary Examiner* — Hung Q Nguyen
*Assistant Examiner* — Anthony Donald Taylor, Jr.
(74) *Attorney, Agent, or Firm* — Davidson, Davidson & Kappel, LLC

(57) ABSTRACT

An internal combustion engine, especially a diesel internal combustion engine, having at least one intercooler, at least one control unit, at least a first and a second cooling circuit, whereby the cooler of the first cooling circuit is flow-connected to a cooling circuit of the internal combustion engine, while the cooler of the second cooling circuit of the internal combustion engine is flow-connected to the intercooler.

20 Claims, 6 Drawing Sheets

(51) Int. Cl.
*F02F 7/00* (2006.01)
*F01P 5/12* (2006.01)

(56) References Cited

U.S. PATENT DOCUMENTS

| | | | | |
|---|---|---|---|---|
| 4,893,590 A * | 1/1990 | Kashimura | ......... | F02D 41/3005 |
| | | | | 123/41.31 |
| 4,911,135 A * | 3/1990 | Nishimura | ......... | F02B 29/0431 |
| | | | | 123/563 |
| 5,215,044 A * | 6/1993 | Banzhaf | ................ | F01P 3/20 |
| | | | | 123/41.05 |
| 6,101,988 A * | 8/2000 | Evans | ................ | F01P 9/00 |
| | | | | 123/41.42 |
| 6,230,669 B1 * | 5/2001 | Evans | ................ | F01P 3/22 |
| | | | | 123/41.42 |
| 6,439,174 B1 * | 8/2002 | Shea | ................ | F02M 25/06 |
| | | | | 123/41.86 |
| 6,564,783 B2 * | 5/2003 | Chou | ................ | F02B 29/0412 |
| | | | | 123/559.1 |
| 7,096,830 B2 * | 8/2006 | Hollis | ................ | F01P 5/12 |
| | | | | 123/41.08 |
| 7,216,609 B2 * | 5/2007 | Theorell | ................ | F01P 3/2207 |
| | | | | 123/41.29 |
| 7,650,753 B2 * | 1/2010 | Muller | ................ | F01P 7/165 |
| | | | | 123/41.31 |
| 7,806,091 B2 | 10/2010 | Esau et al. | | |
| 7,874,154 B2 * | 1/2011 | Raab | ................ | F01P 3/12 |
| | | | | 123/41.01 |
| 8,584,457 B2 * | 11/2013 | Kardos | ................ | F01P 3/20 |
| | | | | 123/41.31 |
| 10,100,786 B2 * | 10/2018 | Bremmer | ................ | F02M 26/22 |
| 2007/0101952 A1 * | 5/2007 | Fujimoto | ................ | F01P 5/12 |
| | | | | 123/41.44 |
| 2009/0007857 A1 * | 1/2009 | Esau | ................ | F02B 29/0412 |
| | | | | 123/41.29 |
| 2011/0088668 A1 * | 4/2011 | Kardos | ................ | F02B 29/0412 |
| | | | | 123/563 |
| 2012/0199104 A1 * | 8/2012 | Vogl | ................ | F01M 13/04 |
| | | | | 123/572 |
| 2014/0158096 A1 * | 6/2014 | Leone | ................ | F02B 29/0468 |
| | | | | 123/563 |
| 2015/0361839 A1 * | 12/2015 | Kimura | ................ | F01M 5/002 |
| | | | | 123/196 A |
| 2016/0076443 A1 * | 3/2016 | Sei | ................ | B60R 13/0838 |
| | | | | 123/198 E |
| 2016/0290211 A1 * | 10/2016 | Mitsuda | ................ | B60K 13/04 |
| 2016/0319716 A1 * | 11/2016 | Mitsuda | ................ | F01N 3/055 |
| 2017/0009635 A1 * | 1/2017 | Mitsuda | ................ | B60K 13/04 |
| 2017/0009639 A1 * | 1/2017 | Mitsuda | ................ | F01N 3/106 |
| 2017/0356398 A1 * | 12/2017 | Bremmer | ................ | F02M 26/22 |

FOREIGN PATENT DOCUMENTS

| | | | |
|---|---|---|---|
| DE | 10 2004 024 289 A1 | 12/2005 | |
| DE | 10 2004 047 452 A1 | 4/2006 | |
| DE | 102006044820 | 4/2008 | |
| DE | 102010004695 A1 | 7/2011 | |
| DE | 10 2011 101 337 A1 | 12/2011 | |
| DE | 102015007533 | 12/2015 | |
| EP | 1 035 306 A2 | 9/2000 | |
| JP | S5557614 A | 4/1980 | |
| JP | S5865927 A | 4/1983 | |
| JP | H0660745 | 8/1994 | |
| JP | H1162583 * | 3/1999 | ............... F01P 3/02 |

* cited by examiner

INTERNAL COMBUSTION ENGINE

This claims the benefit of German Patent Application DE 10 2016 014 904.3, filed Dec. 6, 2016 and hereby incorporated by reference herein.

The invention relates to an internal combustion engine, especially a diesel internal combustion engine, having at least one intercooler, at least one control unit, at least a first and a second cooling circuit, whereby the cooler of the first cooling circuit is flow-connected to the cooling means of the internal combustion engine, while the cooler of the second cooling circuit of the internal combustion engine is flow-connected to the intercooler.

BACKGROUND

German patent application DE 10 2004 047 452 A1 discloses a cooling system for an internal combustion engine, comprising a first cooling circuit for a cylinder head and a second cooling circuit for an engine block, which are connected to each other. A controllable setting member is situated between the first and second cooling circuits in order to regulate the distribution of a coolant stream.

A similar cooling system with a first cooling circuit for cooling the cylinder head and a second cooling circuit for cooling the cylinder block is disclosed in European patent application EP 1 035 306 A2.

German patent application DE 10 2004 024 289 A1 describes a cooling system for a vehicle, having a high-temperature circuit and a low-temperature circuit. The high-temperature circuit is provided for cooling the internal combustion engine, while the low-temperature circuit serves to cool an intercooler and, if applicable, an oil cooler.

German patent application DE 10 2011 101 337 A1 also discloses a circuit arrangement having a low-temperature circuit to cool auxiliary aggregates of an internal combustion engine and a high-temperature circuit to cool the internal combustion engine as well as additional auxiliary aggregates.

Japanese utility model JP 06-60745 U discloses an internal combustion engine having at least one cylinder with a cylinder housing that accommodates a cylinder liner and also having a cylinder head, whereby the cylinder liner is enclosed by a first and a second cooling jacket, whereby the first cooling jacket is flow-connected to a cooling chamber in the cylinder head.

The first cooling jacket is separated from the second cooling jacket inside the cylinder housing in terms of the flow. Similar internal combustion engines are also disclosed in Japanese patent applications JP 55-057614 A or JP 58-65927 A.

At the present time, achieving a highly efficient oil separation poses huge problems for the crankcase ventilation system. There are various systems on the market which attempt to meet the applicable requirements for achieving the highest possible separation efficiency when it comes to the oil fractions present in the blow-by gas. The technical resources involved for this are considerable and correspondingly costly.

SUMMARY OF THE INVENTION

It is an object of the present invention to optimize the charge air cooling circuit in terms of the counter-pressure and the installation space as well as in terms of the acceleration performance of the engine.

A highly efficient, maintenance-free crankcase ventilation system is presented in conjunction with the new charge air cooling concept. The objective is to achieve a highly integrated solution for a line-free engine design.

This objective is achieved according to the invention by an internal combustion engine, especially a diesel internal combustion engine, having at least one intercooler, at least one control unit, at least a first and a second cooling circuit, whereby the cooler of the first cooling circuit is flow-connected to the cooling means of the internal combustion engine, while the cooler of the second cooling circuit of the internal combustion engine is flow-connected to the intercooler.

According to the invention, it is likewise provided for the control unit to be arranged in the area of the intercooler in such a way that said control unit can be cooled by its own cooling circuit.

In another embodiment according to the invention, it is provided that the second cooling circuit is flow-connected to at least one pump.

A refinement according to the invention provides that it has an active crankcase ventilation system comprising at least one Venturi tube.

It is likewise provided according to the invention that the Venturi tube is designed as a sort of ejector pump.

In another embodiment according to the invention, it is provided for the intercooler to be installed on the cylinder head cover virtually line-free.

A refinement according to the invention provides for the first and the second cooling circuits to be flow-connected by means of at least one mixing valve in such a way that, especially during the warm-up phase, the intercooler can be heated up by means of the cooling water of the first circuit.

According to the invention, it is also provided for essentially the entire area above the cylinder head cover to be covered with a bionic hood in order to avoid resonance and excess weight.

In another embodiment according to the invention, it is provided for the bionic hood to have an internal structure or internal ribbing that does not have any identical internal surfaces or internal ribs.

Moreover, the intercooler can be configured so that it can be switched off at cold temperatures. The air-side design of the intercooler is not dependent on customer installation. The cooling circuit of the engine control unit can optionally be integrated if the control unit is integrated into the engine. The entire engine can be visually and acoustically optimized. The charge air path is implemented close to the engine so as to allow an optimal configuration of the engine operation.

BRIEF DESCRIPTION OF THE DRAWINGS

The invention will be explained in greater detail below on the basis of an embodiment, whereby the following is shown.

DETAILED DESCRIPTION

Figure 1:
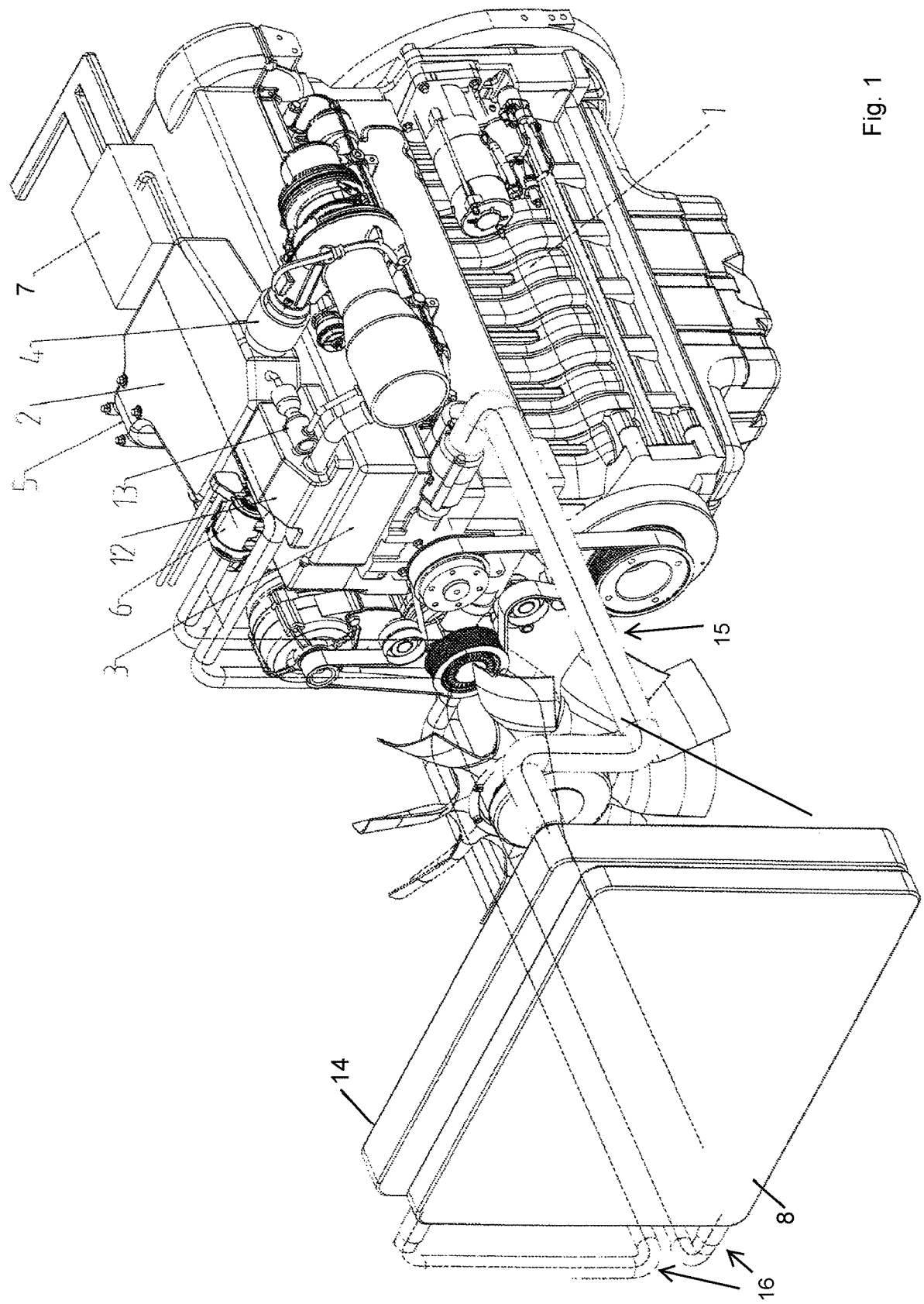
FIG. 1 a view of an internal combustion engine having a high-temperature and a low-temperature circuit without a hood.

FIG. 1 shows a view of an internal combustion engine 1 having a high-temperature circuit 15 and a low-temperature circuit 16 without a hood 11, which will be visible in the figures that follow.

The reciprocating engine 1 has a low-temperature water-air intercooler 2 that is arranged on its valve cover hood 3 in such a way that the uncooled air from the turbocharger 4 can enter the low-temperature water-air intercooler 2 directly, without the need for additional piping. The cold charge air leaving the low-temperature water-air intercooler 2 upstream from the inlet valves of the engine 5 likewise only requires minimum resources in terms of piping. The coolant pump 6, which is located close to the intercooler, ensures an efficient throughput of the coolant in the low-temperature water circuit 16 and, upon request by the engine control unit 7, it pumps the water through the low-temperature cooler 8. The crankcase ventilation system 12 arranged above the valve cover hood 3 is directly adjacent to the low-temperature water-air intercooler 2, so that the Venturi tube 13, which is operatively connected to the low-temperature water-air intercooler 2 and to the crankcase ventilation system 12, is directly adjacent to the crankcase ventilation system 12 and to the low-temperature water-air intercooler 2, likewise only requiring minimum resources in terms of piping. The engine cooler 14 is operatively connected to the cooling circuit of the reciprocating engine 1 and to the cooling water pump so that the high-temperature circuit 15 can cool the reciprocating engine 1.

A low-temperature water-air intercooler 2 is mounted on the reciprocating engine 1 above the valve cover hood 3 in such a way that a direct, flow-optimized connection is established between the (uncooled) side 4 on the compressor side and the cold charge air path upstream from the inlet valves of the engine 5. The system is cooled by a low-temperature water-air intercooler that is arranged upstream from the engine cooler already present there. The coolant for the low-temperature water-air intercooler 2 is supplied by means of an electrically powered, regulatable coolant pump 6 installed close to the intercooler.

The low-temperature coolant circuit 16 that is already present offers the option that an engine control unit 7 that is mounted above the valve cover can be incorporated into this cooling circuit 16.

Figure 2:
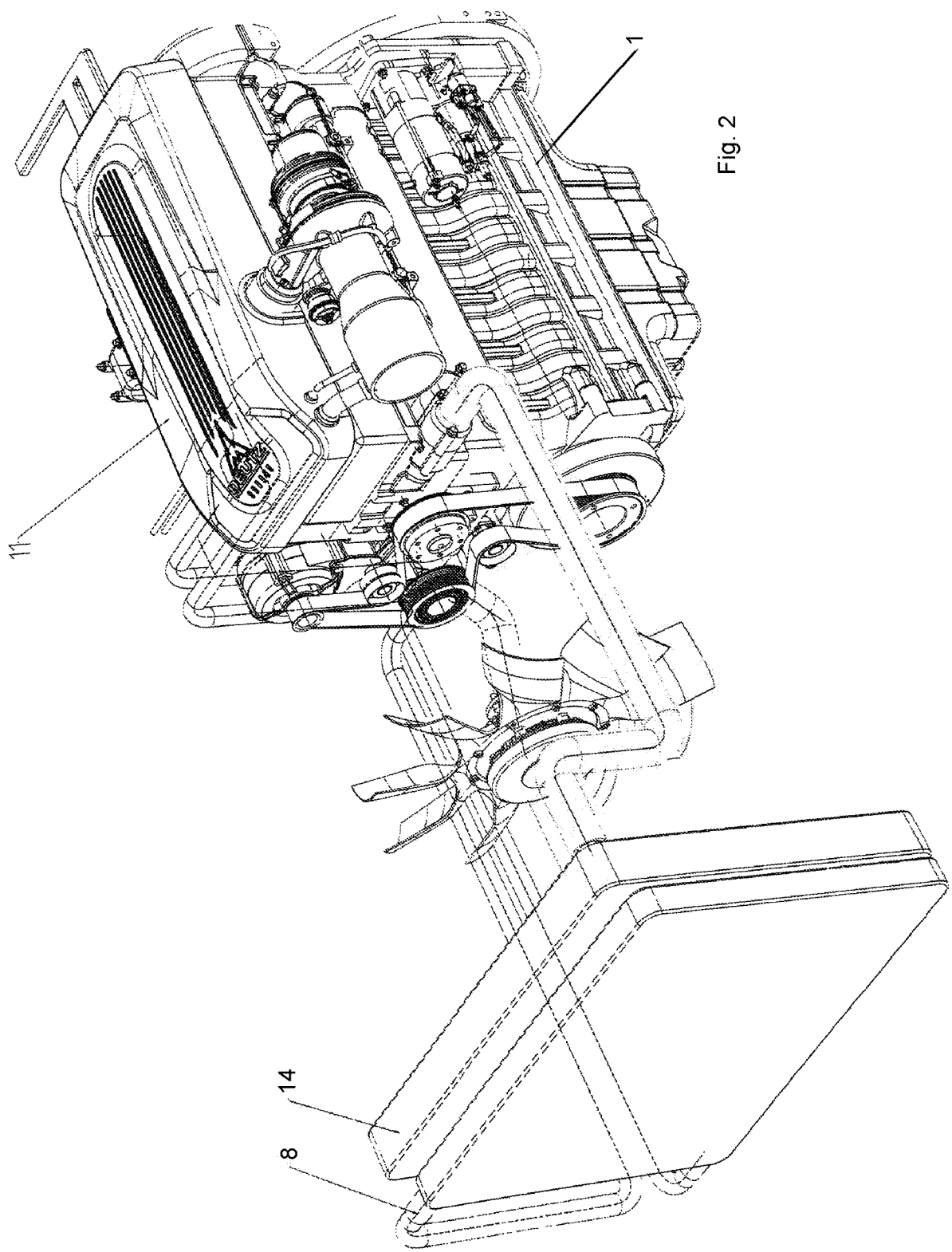
FIG. 2 a view of an internal combustion engine having a high-temperature and a low-temperature circuit with a hood.

FIG. 2 shows a view of an internal combustion engine 1 having a high-temperature circuit 15 and a low-temperature circuit 16 as well as their coolers 8, 14, whereby a hood 11 is arranged over the devices situated on the valve cover hood 3, namely, the engine control unit 7, the low-temperature water-air intercooler 2, the coolant pump 6, the crankcase ventilation system 12 and the Venturi tube 13.

Figure 3:
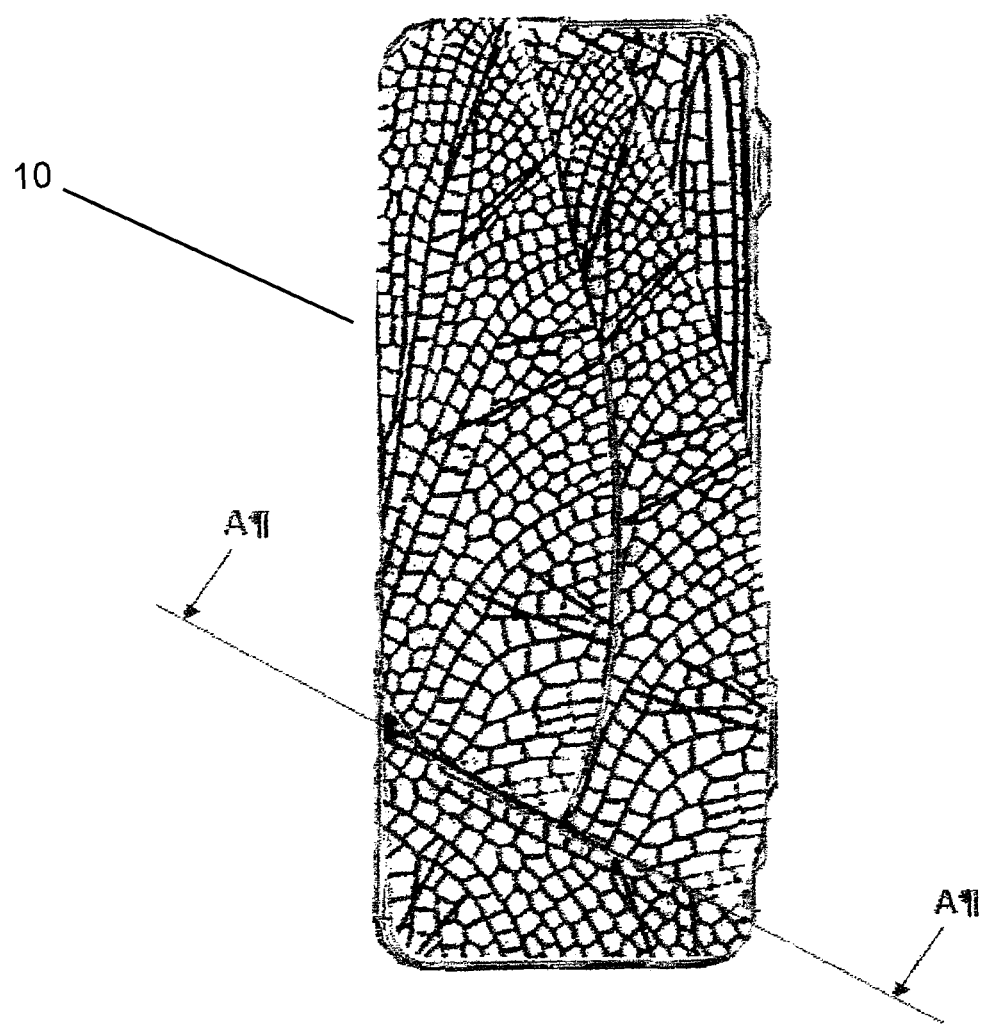
FIG. 3 the interior of the hood shown in FIG. 2.

FIG. 3 shows the interior of the hood 11 depicted in FIG. 2.

Figure 4:
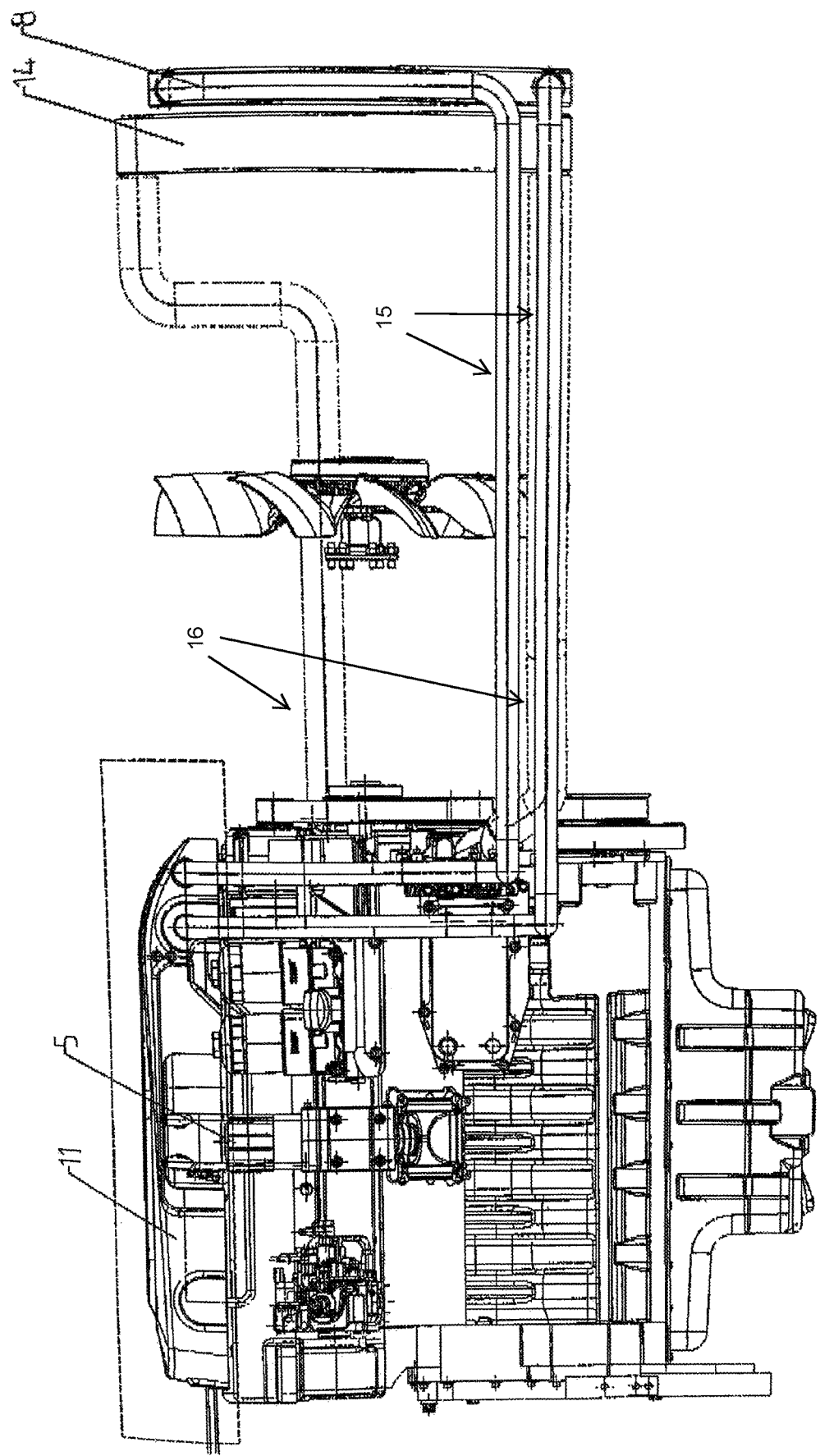
FIG. 4 a side view of the depiction in FIG. 2.

FIG. 4 shows a side view of the depiction in FIG. 2, whereby the above-mentioned unit is configured as an autonomous module.

In this context, the individual components 2, 6, 7, 12 and 13 are covered by a sound-absorbing hood 11 fitted with bionic internal ribbing 10.

Figure 5:
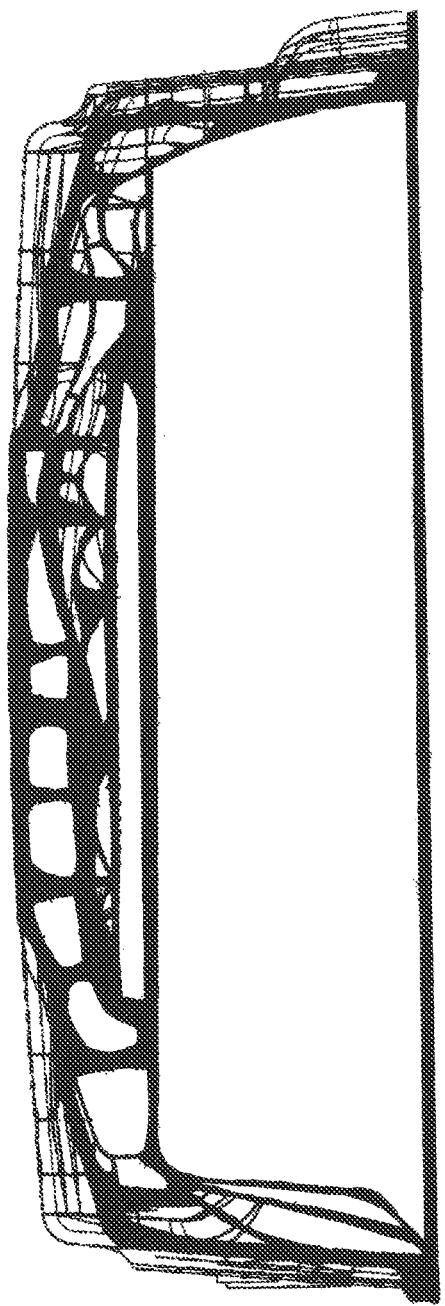
FIG. 5 a section A-A in FIG. 3.

FIG. 5 shows a section A-A of the hood 11 in FIG. 3.

The air path for the charge air takes the shortest and most flow-favorable route.

There is no need for additional piping that could negatively affect the air flow path in the engine. Owing to the complete integration of the system, the engine performs better since the system-relevant losses are reduced.

This consistently ensures an optimal supply of air to the engine. The low flow resistance of the charge air segment translates into a reduction in the fuel consumption of the engine.

The dead volumes in the charge air segment are reduced to the absolute minimum. As a result, the dead time needed to build up the charge pressure is optimized, thus yielding a marked improvement in the engine dynamics. Owing to the regulatable, electrically powered coolant pump used for the low-temperature coolant circuit 16, it is possible to directly influence the temperature of the charge air. During the cold running phase of the engine, the coolant flow in the low-temperature system is reduced to such an extent that the same effect is achieved as when the intercooler is bypassed, along with all of its advantages in terms of the warming up of the engine.

The regulatable cooling of the charge air also translates into a markedly positive influence on the start-up behavior of an exhaust-gas after-treatment system when the engine is warming up.

When the engine is warm, the regulation of the charge air temperature can be utilized to assist the regeneration of an exhaust-gas after-treatment system.

The installation of the engine control unit (ECU) close to the engine gives customers clear-cut handling advantages. If the control unit is mounted above the valve hood, the vast majority of the cabling used up until now can be mounted so as to concealed and thus protected. The number of transfer points (connectors) to the unit as well as the requisite line lengths can likewise be reduced. The cooling for the ECU can be fully integrated into the low-temperature cooling circuit 16 of the charge air cooling module using very short lines. The engine control unit no longer needs to be incorporated into the fuel circuit for cooling purposes. This brings about a substantial reduction in costs. Moreover, the engine architecture becomes considerably more clear and the outward appearance of the engine improves markedly.

A cover hood with bionic internal ribbing is externally characterized by a smooth, dirt-repellent surface. The requisite stiffness of the component is ensured by a support structure that is completely irregular but that nevertheless optimally withstands the forces that are introduced. The advantage of the bionic internal ribbing lies in the optimal material utilization for the hood and in the optimization of the acoustic properties since there are no similar surface elements that together could be caused to vibrate due to resonance of the engine. If a resonance frequency were to be encountered, then only a very small segment of the hood could be caused to vibrate, and this has a favorable impact on the sound radiation of the entire engine.

As can be seen in FIG. 1, the low-temperature water-air intercooler 2 is mounted above the valve cover hood 3 in such a way that, on the charge air side, a direct, flow-optimized connection is created between the (uncooled) side 4 on the compressor side and the cold charge air path upstream from the inlet valves of the engine 5.

The low-temperature water-air intercooler 2 is supplied with coolant by means of an electrically powered, regulatable coolant pump 6 that is installed near the intercooler and that can be directly or indirectly regulated by the engine control unit 7.

The low-temperature coolant circuit 16 that is already present offers the option that an engine control unit 7 that is mounted above the valve cover can be incorporated into this cooling circuit 16.

The unit described above is configured as an autonomous module.

In this context, the individual components are covered by a sound-absorbing hood 11 fitted with bionic internal ribbing 10.

This hood 11 comprises a highly efficient crankcase ventilation system 12 that functions according to the so-called baffle plate principle or cyclone principle or else as a combination thereof and/or of other prior-art separation systems.

For purposes of ensuring an appropriate increase in the efficiency of the system, it is necessary to feed in external energy in order to achieve a pressure differential to enhance the separation efficiency.

For this reason, a Venturi tube 13 is integrated into the hood 11 described above and it uses the boost pressure present in the intercooler 2 in order to generate the requisite negative pressure in the crankcase ventilation system 12. A defined partial stream is withdrawn from the preloaded charge air segment and then returned to the intake system of the engine at a suitable place.

The air path for the charge air takes the shortest and most flow-favorable route.

This consistently ensures an optimal supply of air to the engine. The low flow resistance of the charge air segment translates into a reduction in fuel consumption of the engine and minimizes the losses.

The dead volumes in the charge air segment are reduced to the absolute minimum. As a result, the dead time needed to build up the charge pressure is optimized, thus yielding a marked improvement in the engine dynamics. Owing to the regulatable, electrically powered coolant pump 6 used for the low-temperature coolant circuit 16, it is possible to directly influence the temperature of the charge air. During the cold running phase of the engine, the coolant flow in the low-temperature system is reduced to such an extent that the same effect is achieved as when the intercooler is bypassed, along with all of its advantages in terms of the warming up of the engine.

The regulatable cooling of the charge air also translates into a markedly positive influence on the start-up behavior of an exhaust-gas after-treatment system when the engine is warming up.

When the engine is warm, the regulation of the charge air temperature can be utilized to assist the regeneration of an exhaust-gas after-treatment system.

The installation of the engine control unit 7 (ECU) close to the engine gives customers handling advantages, especially when the car is serviced. If the control unit is amounted above the valve cover hood, the vast majority of the cabling used up until now can be concealed and thus protected. The number of transfer points (connectors) to the unit as well as the requisite line lengths can likewise be reduced. The cooling for the ECU can be fully integrated into the low-temperature cooling circuit 16 of the charge air cooling module using very short lines. The engine control unit 7 no longer needs to be incorporated into the fuel circuit for cooling purposes. This brings about a substantial reduction in costs. Moreover, the engine architecture becomes considerably more clear and the outward appearance of the engine improves markedly.

A cover hood 11 with bionic internal ribbing 10 is externally characterized by a smooth, dirt-repellent surface. The requisite stiffness of the component is ensured by a support structure that is completely irregular but that nevertheless optimally withstands the forces that are introduced. The advantage of the bionic internal ribbing 10 lies in the optimal material utilization for the hood and in the optimization of the acoustic properties since there are no similar surface elements that together could be caused to vibrate due to resonance of the engine. If a resonance frequency were to be encountered, then only a very small segment of the hood could be caused to vibrate, and this has a favorable impact on the sound radiation of the entire engine.

Considerable technical resources are needed in order to achieve a high separation efficiency when it comes to the oil particles contained in the engine's blow-by gas in the crankcase ventilation system of a reciprocating internal combustion engine. This is particularly the case with an eye towards future emissions legislation.

At the present time, this can actually only be realized by employing external energy.

For this purpose, as an alternative to the prior-art, externally driven rotary systems, it is possible to use an excess pressure as the drive energy in order to generate a sufficiently high pressure differential in the crankcase ventilation system, as is necessary in order to reach the requisite separation efficiency.

Here, the crankcase ventilation system 12 is now integrated directly into the charge air system of a charged reciprocating engine 1, which is done without lines or with only minimal line resources using a Venturi tube 13 that serves to generate the necessary negative pressure and using an intercooler 2.

In this context, this system forms a module that can optionally be mounted onto an existing engine.

In this manner, minimal installation resources can yield a highly efficient separation system for oil particles from the blow-by gas of a reciprocating internal combustion engine.

The entire structure is installed so as to be concealed under a noise emission-optimized cover hood 11 fitted with bionic internal ribbing 10.

Bionic Cover Hood:

The internal support structure matches, for example, the support structure of the wing of a dragonfly.

It can be structured like a wing or else it can consist of several segments of a wing structure which are arranged either symmetrically or asymmetrically.

The height of the ribbing can be constant, but ideally, it follows the bionic pattern and renders the material used dependent on the force curve in the component.

Figure 6:
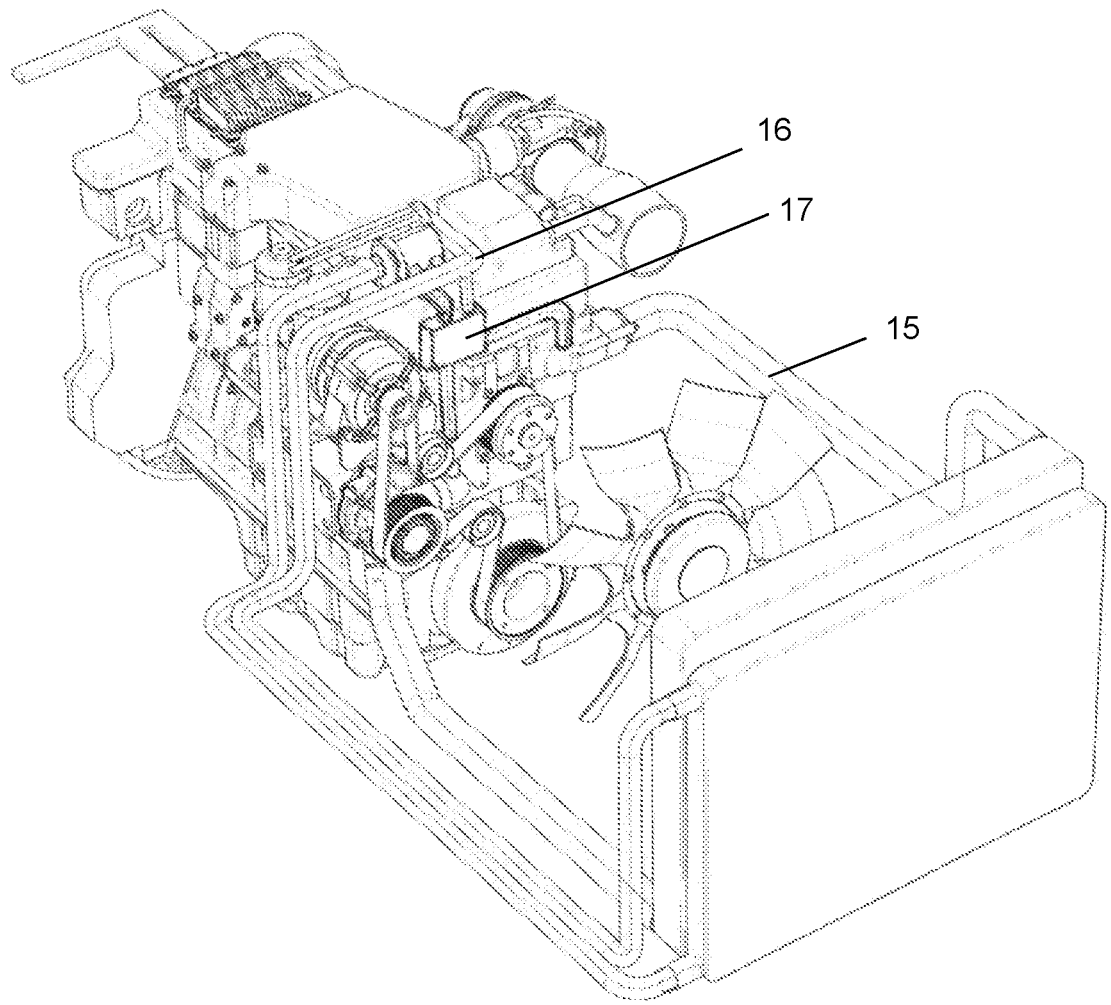
FIG. 6 a view of an internal combustion engine having a high-temperature and a low-temperature circuit without a hood and including a mixing valve.

FIG. 6 schematically shows the first cooling circuit 15 and the second cooling circuit 16 being flow-connected by a mixing valve 17 in such a way that the intercooler 2 can be heated up by cooling water of the first cooling circuit 15.

LIST OF REFERENCE NUMERALS

1 reciprocating engine
2 low-temperature water-air intercooler
3 valve cover hood
4 uncooled air from the turbocharger
5 cold charge air path upstream from the inlet valves of the engine
6 coolant pump installed close to the intercooler
7 engine control unit
8 low-temperature cooler
10 bionic internal ribbing
11 hood
12 crank case ventilation system 13 Venturi tube
14 engine cooler
15 high-temperature circuit
16 low-temperature circuit
17 mixing valve

What is claimed is:

1. An arrangement for an internal combustion engine comprising:
   at least one intercooler;
   at least one control unit;
   a first and a second cooling circuit, a first cooler of the first cooling circuit being configured for delivering coolant via the first cooling circuit to the internal combustion engine, while a second cooler of the second cooling circuit is configured for delivering coolant via the second cooling circuit to the at least one intercooler;
   an active crankcase ventilation system operatively connected to at least one Venturi tube, wherein the at least one Venturi tube is designed as an ejector pump connected between the active crankcase ventilation system and the at least one intercooler; and
   a valve cover, wherein the at least one intercooler, the at least one control unit, and the active crankcase ventilation system are fixed directly on top of the valve cover.

2. The arrangement according to claim 1, wherein the at least one control unit is arranged near the at least one intercooler in such a way that the at least one control unit can be cooled by the second cooling circuit, the at least one control unit configured for requesting at least one coolant pump to pump coolant through the second cooler.

3. The arrangement according to claim 1, wherein the second cooling circuit is fluidly coupled to at least one coolant pump.

4. The arrangement according to claim 1, further comprising at least one coolant pump arranged on top of the valve cover.

5. The arrangement according to claim 4, wherein the active crankcase ventilation system is positioned directly beside the at least one intercooler.

6. The arrangement according to in claim 1, wherein the first and the second cooling circuits are flow-connected by at least one mixing valve in such a way that the at least one intercooler can be heated up by coolant of the first cooling circuit.

7. The arrangement according to claim 1, wherein an area above the valve cover is covered with a bionic hood.

8. The arrangement according to in claim 7, wherein the bionic hood has an internal structure comprised of an irregular ribbing.

9. The arrangement according to claim 1, wherein the internal combustion engine is a diesel internal combustion engine.

10. The arrangement according to claim 2, wherein the at least one control unit is positioned directly beside the at least one intercooler.

11. The arrangement according to claim 1, further comprising a turbocharger, the at least one intercooler being arranged with respect to the turbocharger such that uncooled air from the turbocharger enters the at least one intercooler directly.

12. The arrangement according to claim 1, wherein the active crankcase ventilation system is positioned directly beside the at least one intercooler.

13. The arrangement according to claim 5, wherein the at least one Venturi tube is configured to use a boost pressure of the at least one intercooler in order to generate a negative pressure in the active crankcase ventilation system wherein.

14. The arrangement according to claim 7, wherein each of the at least one control unit, the at least one intercooler, and the active crankcase ventilation system are completely covered by the bionic hood.

15. A vehicle cooling system for an internal combustion engine comprising:
   at least one intercooler;
   at least one control unit;
   a first and a second cooling circuit, a first cooler of the first cooling circuit being configured for delivering coolant via the first cooling circuit to the internal combustion engine, while a second cooler of the second cooling circuit is configured for delivering coolant via the second cooling circuit to the at least one intercooler;
   an active crankcase ventilation system operatively connected to at least one Venturi tube, wherein the at least one Venturi tube is designed as an ejector pump connected between the active crankcase ventilation system and the at least one intercooler; and
   a valve cover, wherein the at least one intercooler, the at least one control unit, and the active crankcase ventilation system are fixed directly on top of the valve cover.

16. The arrangement according to claim 1, wherein the at least one intercooler is a water-air intercooler.

17. The arrangement according to claim 1, wherein uncooled air from a turbocharger enters the at least one intercooler directly on a first side of the at least one intercooler, and cooled air exits from a second side of the at least one intercooler opposite the first side at a cold charge air path upstream from at least one inlet valve of the internal combustion engine.

18. An internal combustion engine comprising:
   at least one intercooler;
   at least one control unit;
   a first and a second cooling circuit, a first cooler of the first cooling circuit being configured for delivering coolant via the first cooling circuit to the internal combustion engine, while a second cooler of the second cooling circuit is configured for delivering coolant via the second cooling circuit to the at least one intercooler;
   an active crankcase ventilation system operatively connected to at least one Venturi tube, wherein the at least one Venturi tube is designed as an ejector pump connected between the active crankcase ventilation system and the at least one intercooler; and
   a valve cover, wherein the at least one intercooler, the at least one control unit, and the active crankcase ventilation system are fixed directly on top of the valve cover.

19. The arrangement according to claim 4, wherein the active crankcase ventilation system is positioned between the at least one coolant pump and the at least one Venturi tube.

20. The arrangement according to claim 4, further comprising a sound-absorbing hood, each of the at least one intercooler, the at least one coolant pump, the at least one control unit, and the at least one Venturi tube being completely covered by the sound-absorbing hood.

* * * * *